US012791155B2

(12) United States Patent
Kamiyama et al.

(10) Patent No.: US 12,791,155 B2
(45) Date of Patent: Nov. 10, 2026

(54) IRRADIATION DEVICE

(71) Applicant: SHONAN GOSEI-JUSHI SEISAKUSHO K.K., Hiratsuka (JP)

(72) Inventors: Takao Kamiyama, Hiratsuka (JP); Hansang Chi, Hiratsuka (JP); Kazuhiro Kamiyama, Hiratsuka (JP); Hiroyuki Makuuchi, Hiratsuka (JP)

(73) Assignee: SHONAN GOSEI-JUSHI SEISAKUSHO K.K., Hiratsuka (JP)

( * ) Notice: Subject to any disclaimer, the term of this patent is extended or adjusted under 35 U.S.C. 154(b) by 101 days.

(21) Appl. No.: 18/994,228

(22) PCT Filed: Jun. 7, 2023

(86) PCT No.: PCT/JP2023/021118

§ 371 (c)(1),
(2) Date: Nov. 25, 2025

(87) PCT Pub. No.: WO2024/014190

PCT Pub. Date: Jan. 18, 2024

(65) Prior Publication Data

US 2026/0063256 A1 Mar. 5, 2026

(30) Foreign Application Priority Data

Jul. 14, 2022 (JP) ................................ 2022-112838

(51) Int. Cl.

| | |
|---|---|
| ***F21S 4/24*** | (2016.01) |
| ***B29C 63/34*** | (2006.01) |
| ***F16L 55/165*** | (2006.01) |
| ***F21V 23/00*** | (2015.01) |
| ***F21V 23/06*** | (2006.01) |
| *E03F 3/06* | (2006.01) |

(Continued)

(52) U.S. Cl.

CPC ................ *F21S 4/24* (2016.01); *B29C 63/34* (2013.01); *F16L 55/165* (2013.01); (Continued)

(58) Field of Classification Search

CPC .......... F21S 4/24; F21V 23/006; F21V 23/06; F16L 55/165; F16L 2101/18; E03F 2003/065

See application file for complete search history.

(56) References Cited

U.S. PATENT DOCUMENTS

| | | | | |
|---|---|---|---|---|
| 2018/0194072 | A1* | 7/2018 | Kuzniar | B29C 65/14 |
| 2019/0016021 | A1* | 1/2019 | Noll | F16L 55/165 |

(Continued)

FOREIGN PATENT DOCUMENTS

| | | |
|---|---|---|
| JP | H09-057851 A | 3/1997 |
| JP | H11-198230 A | 7/1999 |

(Continued)

OTHER PUBLICATIONS

Noll, Method and Device for Renewing Pipelines, 2009, WO2009021644A2, https://worldwide.espacenet.com/patent/search/family/040279389/publication/WO2009021644A2?q=pn%3DWO2009021644A2 (Year: 2009).*

(Continued)

*Primary Examiner* — James R Greece
*Assistant Examiner* — Michael Chiang
(74) *Attorney, Agent, or Firm* — MOSER TABOADA

(57) ABSTRACT

A plurality of flexible substrates 10 disposed in a spiral at regular intervals on a columnar surface and provided with a plurality of light sources; and the same number of flexible substrates 20 disposed in a reverse spiral. Both substrates are disposed to cause one end portion of each substrate to cross each other and also to cause the other end portion to cross the other end portion of each corresponding substrate in accordance with a spiral shape. Both substrates are rotatably coupled to each other in crossing areas at both end portions and other crossing areas where they cross each other in accordance with the spiral shape.

7 Claims, 9 Drawing Sheets

(51) Int. Cl.

| | |
|---|---|
| *F16L 55/18* | (2006.01) |
| *F16L 101/18* | (2006.01) |
| *F21Y 103/10* | (2016.01) |
| *F21Y 115/10* | (2016.01) |

(52) U.S. Cl.
CPC ............ *F21V 23/006* (2013.01); *F21V 23/06* (2013.01); *E03F 2003/065* (2013.01); *F16L 55/18* (2013.01); *F16L 2101/18* (2013.01); *F21Y 2103/10* (2016.08); *F21Y 2115/10* (2016.08)

(56) References Cited

U.S. PATENT DOCUMENTS

| | | | | |
|---|---|---|---|---|
| 2020/0166172 | A1* | 5/2020 | Liu | F16L 55/162 |
| 2022/0412513 | A1* | 12/2022 | Van Bommel | F21K 9/232 |

FOREIGN PATENT DOCUMENTS

| | | | | |
|---|---|---|---|---|
| JP | 2008-924 | A | 1/2008 | |
| JP | 2008-142996 | A | 6/2008 | |
| JP | 2008-246986 | A | 10/2008 | |
| JP | 2020-518973 | A | 6/2020 | |
| WO | WO-2009021644 | A2 * | 2/2009 | F16L 55/165 |

OTHER PUBLICATIONS

International Search Report for PCT/JP2023/021118 dated Jul. 18, 2023.

* cited by examiner

IRRADIATION DEVICE

TECHNICAL FIELD

The present disclosure relates to an irradiation device arranged inside a cylindrical object to irradiate an inner wall of the cylindrical object with light.

BACKGROUND ART

For rehabilitation of a cylindrical main pipe of sewerage and the like, pipe lining materials are used that are made of a tubular flexible resin absorbing material being impregnated with a curing resin. Such a pipe lining material is reversed or led in to be transferred into the main pipe, and while the pipe lining material fully contacts the inner surface of the main pipe, the curing resin is cured to cause the main pipe to have an inner circumferential surface being lined. As the curing resin, a thermosetting resin, a photocurable resin, or a combination thereof is used, and the photocurable resin is cured with ultraviolet light emitted from an ultraviolet light source.

PTL 1 describes a configuration in which a curing device provided with a plurality of ultraviolet light sources disposed circumferentially is attached to a light source wagon and the light source wagon is run in a pipe to cure a photocurable resin impregnated into a pipe lining material.

PTL 2 describes a configuration in which a plurality of ultraviolet lamps are coupled to each other to configure a light train and a pipe lining material is irradiated with ultraviolet light to cure a photocurable resin.

PTL 3 describes a configuration in which a plurality of LEDs emitting ultraviolet light are arranged on a surface of a cylindrical object and the cylindrical object is run in a pipe to cure a photocurable resin impregnated into a pipe lining material.

CITATION LIST

Patent Literature

PTL 1: JP H09-057851 A
PTL 2: JP H11-198230 A
PTL 3: JP 2008-142996 A

SUMMARY OF INVENTION

Technical Problem

All the irradiation devices described in PTLs 1 through 3 are configured to have ultraviolet light sources or a cylindrical object provided with ultraviolet light sources arranged at the center of the pipe cavity to relatively uniformly irradiate the pipe lining material with ultraviolet light.

However, when the light sources are distant from the pipe wall, there is a problem that, to secure integrated light intensity, higher-output light sources have to be used or irradiation time have to be extended by slowing down the tractive rate.

In addition, relatively uniform irradiation is obtained when the pipe diameter is fixed, but there is a defect that uniform illumination is not obtained when the pipe diameter varies because the radial distance from the center of light emission of the light sources differs between the upper portion and the lower portion. There is thus a problem that a complex mechanism is required to adjust the height of the irradiation device in accordance with the pipe diameter.

The present invention has been made to solve these problems and it is an object thereof to provide an irradiation device that is capable of uniform irradiation of an inner wall surface of a pipe with light rays even if the pipe diameter varies.

Solution to Problem

The present invention (claim 1) is an irradiation device arranged inside a cylindrical object to irradiate an inner wall of the cylindrical object with light, the device including:

- a plurality of long flexible first substrates disposed in a spiral at regular intervals on a columnar surface and provided with a plurality of light sources; and
- the same number of long flexible second substrates as the first substrates, the second substrates being located on an opposite side to a surface provided with the light sources of the first substrates and being disposed in a reverse spiral to the first substrates, wherein
- the first and second substrates are disposed to cause one end portion of each first substrate to cross one end portion of each second substrate and also to cause another end portion to cross another end portion of each corresponding second substrate in accordance with a spiral shape, and
- the first and second substrates are rotatably coupled to each other in crossing areas at both end portions of each of the first and second substrates and other crossing areas where the first and second substrates cross each other in accordance with the spiral shape.

Advantageous Effects of Invention

The present invention causes the substrates provided with the plurality of light sources to be disposed in a spiral shape and thus allows uniform irradiation with no circumferential polarization even if the irradiation device has an enlarged diameter or a reduced diameter. In addition, even if the cylindrical object to which the irradiation device is arranged has a varied diameter, the diameter of the irradiation device is enlarged or reduced in accordance with the diameter of the cylindrical object and thus the irradiation distance from the inner wall of the cylindrical object is fixed to allow uniform irradiation with an even amount of light. Still in addition, even if the cylindrical object has a varied diameter, each light source is located near the inner wall to allow efficient irradiation even with low-output light sources.

DESCRIPTION OF EMBODIMENTS

The present invention is used to irradiate a lining material provided on an inner wall of a pipe cavity of sewerage and the like with light and to cure a curing resin impregnated into the lining material while its application is not limited to this and the present invention may also be applied to an embodiment to be arranged inside a cylindrical object to irradiate an inner wall of the cylindrical object with light.

Figure 1:
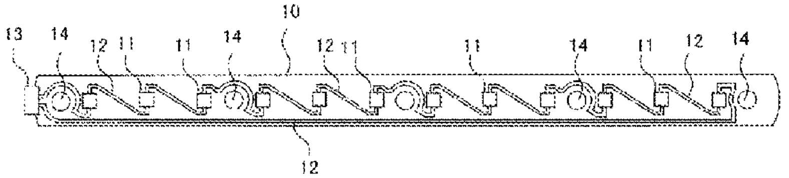
FIG. 1 is a top view of a first substrate on which a plurality of LED light sources are disposed.
Figure 2:
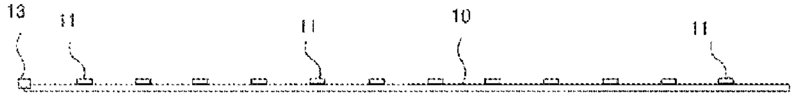
FIG. 2 is a side view of the first substrate.

FIG. 1 and FIG. 2 illustrate a flexible and elastic long thin metal substrate 10 (first substrate). On the substrate 10, a plurality (12, in this embodiment) of light sources are arranged at regular intervals. Each light source is, for example, an LED 11 emitting any one of ultraviolet light, visible light, or infrared light or an LED obtained by combining LEDs emitting these kinds of light.

Each LED 11 is connected in series with a lead wire (not shown) wired along a groove 12 and is supplied with power via a connector 13 to emit the light rays described above. In FIG. 1, a plurality (five, in this embodiment) of circular holes 14 are formed to pass coupling pins 15 (FIG. 4) to be rotatably coupled to a substrate 20 described later (second substrate).

Figure 3:
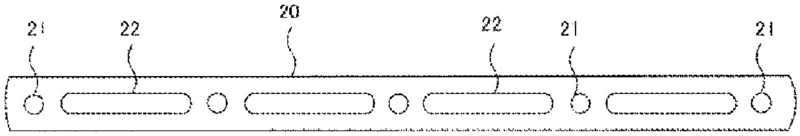
FIG. 3 is a top view of a second substrate that is arranged inside the first substrate and rotatably coupled to the first substrate.

FIG. 3 illustrates the substrate 20 arranged to cross the substrate 10. The number, shape, and length of the substrate 20 are same as those of the substrate 10, and the flexible and elastic long thin metal substrate 20 is made of a material identical to or different from that of the substrate 10. The substrate 20 is provided with circular holes 21 formed in positions corresponding to the circular holes 14 of the substrate 10 to pass the coupling pins 15, and openings 22 are formed between the circular holes 21. The openings 22 have a function of roughly equalizing the degree of deflection between the substrate 10 and the substrate 20 if the material or the thickness is different between the substrate 10 and the substrate 20.

Figure 4:
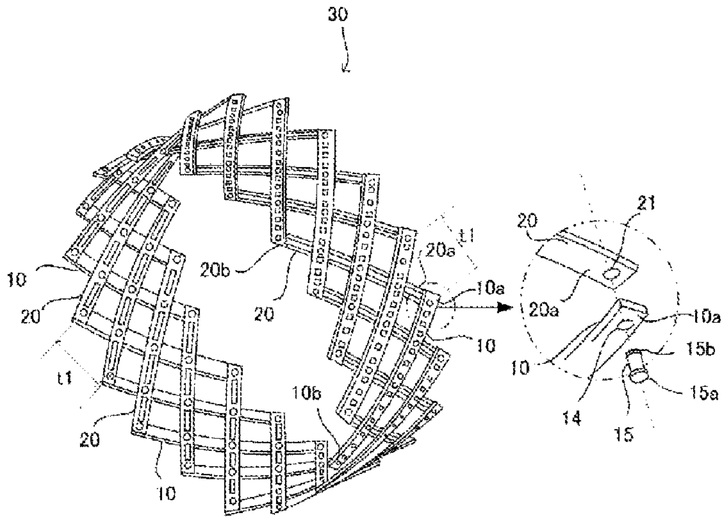
FIG. 4 is a perspective view of a light source assembly in which the first and second substrates are caused to cross each other to be disposed in a lattice.

As illustrated in FIG. 4, the substrates 10 are disposed in a spiral at regular intervals t1 on a columnar surface and the substrates 20 are disposed at the regular intervals t1 in a reverse spiral in a winding direction opposite to the spiral of the substrates 10 on the opposite side to the surface provided with the LEDs 11 of the substrates 10.

Each substrate 10 and each substrate 20 have one end 10*a* and one end 20*a*, respectively, and cross each other by putting the one ends 10*a* and 20*a* together with the circular holes 14 and 21, and the coupling pins 15 are inserted into the circular holes 14 and 21. As illustrated in the enlarged view of FIG. 4, each coupling pin 15 has one end 15*a* larger than the diameter of the circular hole 14 and has the other end 15*b* as a rivet end, and when the other end 15*b* is riveted, the substrate 10 and the substrate 20 are coupled to each other in a rotatable manner about the coupling pin 15 as an axis.

The substrate 10 and the substrate 20 have the respective other ends 10*b* and 20*b* to cross the other ends 10*b* and 20*b* of different substrate 10 and substrate 20 in accordance with the spiral shape, and thus the circular holes 14 and 21 are similarly put together to be rotatably coupled to each other with the coupling pin 15. The substrate 10 and the substrate 20 cross each other in a plurality of areas (three areas, in this embodiment) as well as both end portions in accordance with the spiral shape, and thus the crossing areas are also rotatably coupled with the coupling pins 15. It should be noted that the end portions 15*b* of the coupling pins 15 may be fastened with an ultra-low head screw, an E ring, and the like.

Figure 5:
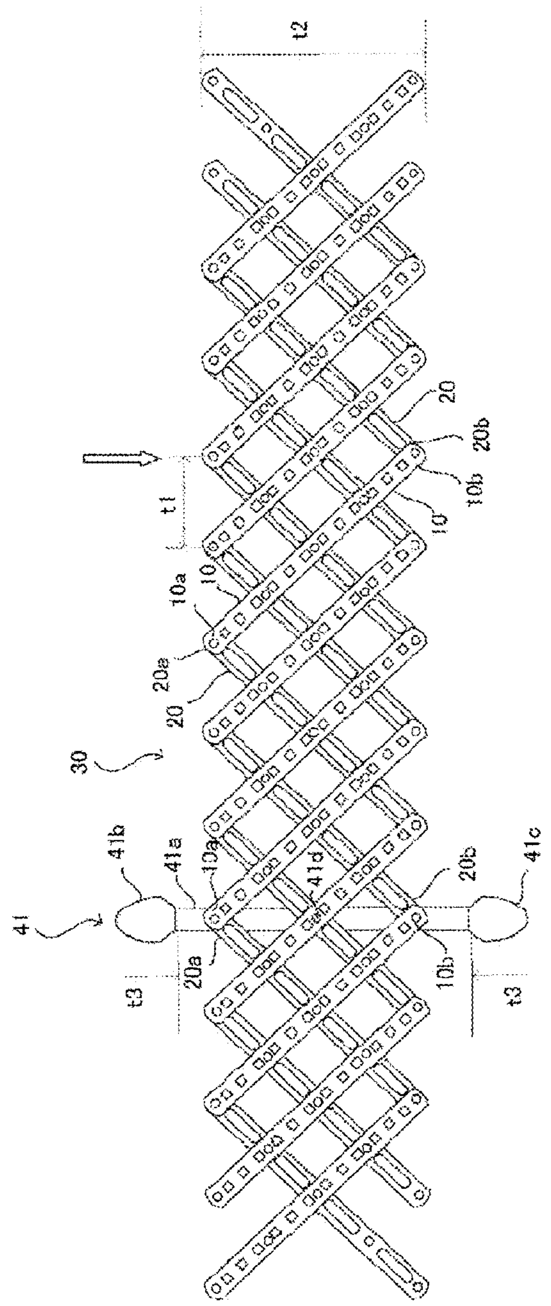
FIG. 5 is a development illustrating part of the light source assembly developed on a plane surface.

In such a manner, the substrates 10 and the substrates 20 are rotatably coupled to each other in the crossing areas at the respective both end portions as well as other crossing areas in accordance with the spiral shape and are disposed to have a lattice shape to assemble a light source assembly 30 functioning as a cylindrical irradiation device as illustrated in FIG. 4. FIG. 5 illustrates part of the light source assembly 30 developed on a plane surface. Although the number of the substrates 10 and the substrates 20 to be used depends on the expected irradiation intensity and the diameter of the pipe in which the irradiation device is arranged, it is preferably from 10 to 30, approximately, and an example is illustrated in this embodiment where the 20 substrates 10 and the 20 substrates 20 are used.

The substrates 10 and the substrates 20 are rotatably coupled to each other in the crossing areas, and when a force causing enlargement or reduction in the diameter is applied to the light source assembly 30, the substrates 10 and the substrates 20 rotate in the crossing areas and the light source assembly 30 expands or contracts in the extending direction (longitudinal direction) accordingly. Meanwhile, when a force to expand or contract the light source assembly 30 in the longitudinal direction is applied, the substrates 10 and the substrates 20 similarly rotate in the crossing areas to enlarge or reduce the diameter of the light source assembly 30.

Figure 6:
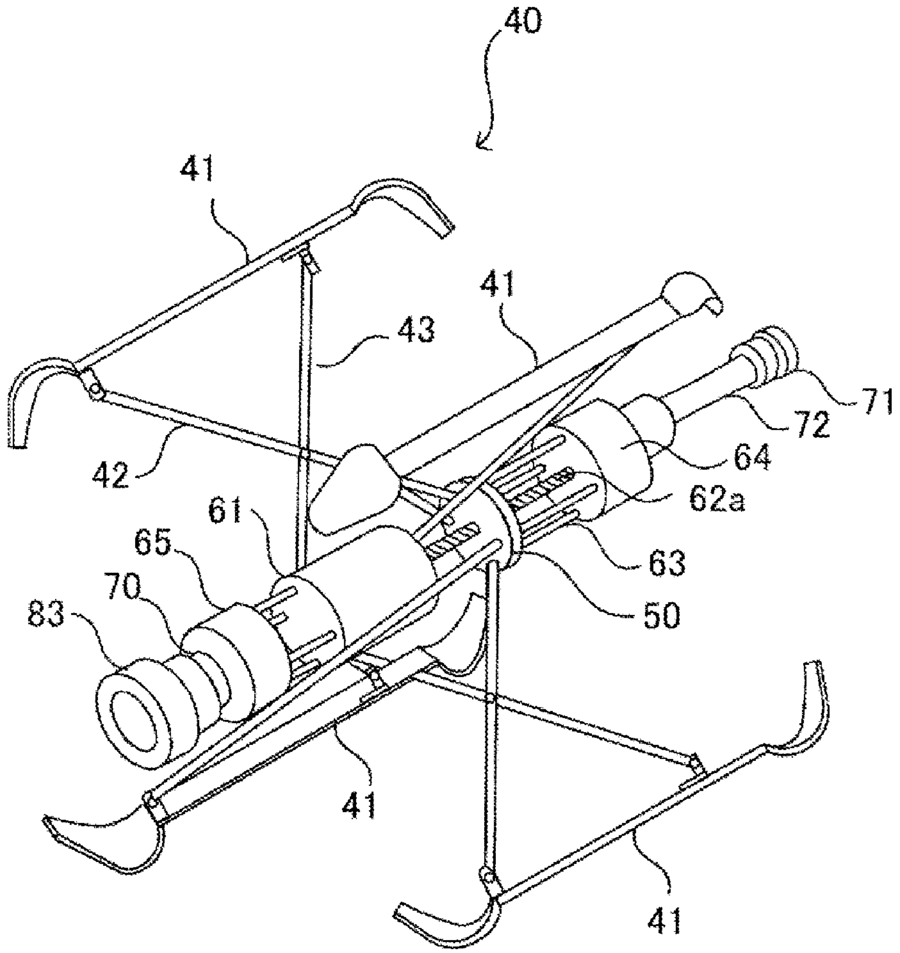
FIG. 6 is a perspective view illustrating a driving mechanism to cause the light source assembly to have an enlarged or reduced diameter.
Figure 7:
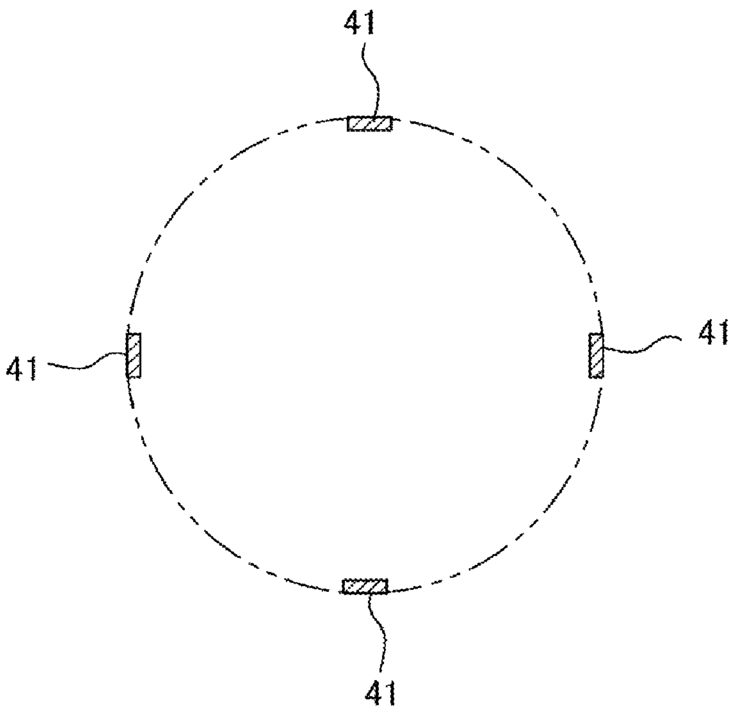
FIG. 7 is a drawing illustrating arrangement of attachment plates to which crossing areas of the first substrates and the second substrates are attached.

FIG. 6 illustrates a driving mechanism 40 that is arranged inside the light source assembly 30 to cause the light source assembly 30 to have an enlarged or reduced diameter. The driving mechanism 40 has a plurality (four, in this embodiment) of metal attachment plates 41 to attach the crossing areas between the substrates 10 and the substrates 20. The attachment plates 41 extend in parallel with the cylindrical axis of the light source assembly 30, and as illustrated in FIG. 7, are arranged at predetermined circumferential intervals of the cylinder (at regular intervals, in this embodiment). The more attachment plates 41 are preferred because they stabilize the shape of the light source assembly 30 and also facilitate enlargement or reduction in the diameter, whereas the more attachment plates 41 cause the structure of the driving function to be more complex, and thus three through six of them are preferred.

Figure 8:
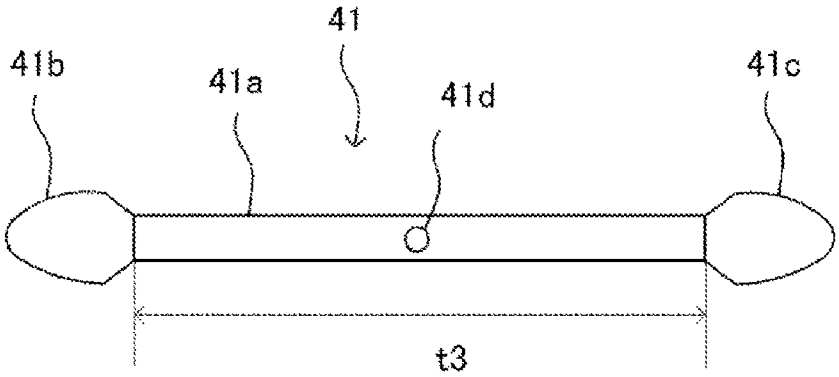
FIG. 8 is a top view of the attachment plate.
Figure 9:
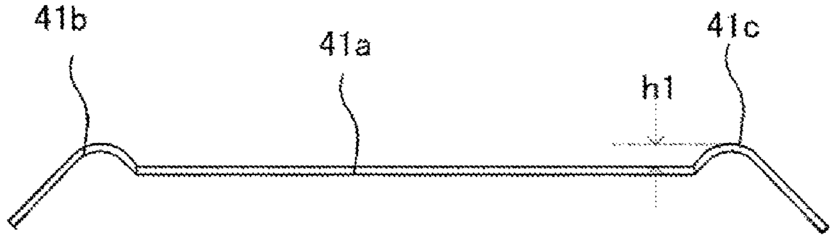
FIG. 9 is a side view of the attachment plate.

As illustrated in FIGS. 5, 8, and 9, each attachment plate 41 has a flat portion 41*a* with a length t3 longer than a cylindrical length t2 of the light source assembly 30 and projecting portions 41*b* and 41*c* with a length identical to each other in a curved shape projecting a distance h1 radially outward from the plane surface of the flat portion 41*a*. The flat portion 41*a* is provided with a circular hole 41*d* formed at the central area to attach the crossing areas between the substrate 10 and the substrate 20.

In this embodiment, as illustrated in FIG. 5, the attachment plate 41 is arranged to locate both end portions where the substrates 10 and the substrates 20 cross each other on the attachment plate 41, and one area where the substrate 10 and the substrate 20 cross each other between both end portions is attached to the attachment plate 41. Since the substrate 10 and the substrate 20 cross each other at an intermediate portion of the attachment plate 41, the crossing area is rotatably attached to the attachment plate 41 with the coupling pin 15 by putting together with the circular hole 41*d* of the attachment plate 41. Since the 20 substrates 10, the 20 substrates 20, and the four attachment plates 41 are provided, an intermediate crossing portion is attached to the attachment plate 41 as well in the area indicated by a thick arrow in FIG. 5. Such attachment of the crossing areas to the attachment plates 41 allows the light source assembly 30 to readily and securely have an enlarged or reduced diameter without deformation of the light source assembly 30.

Figure 10:
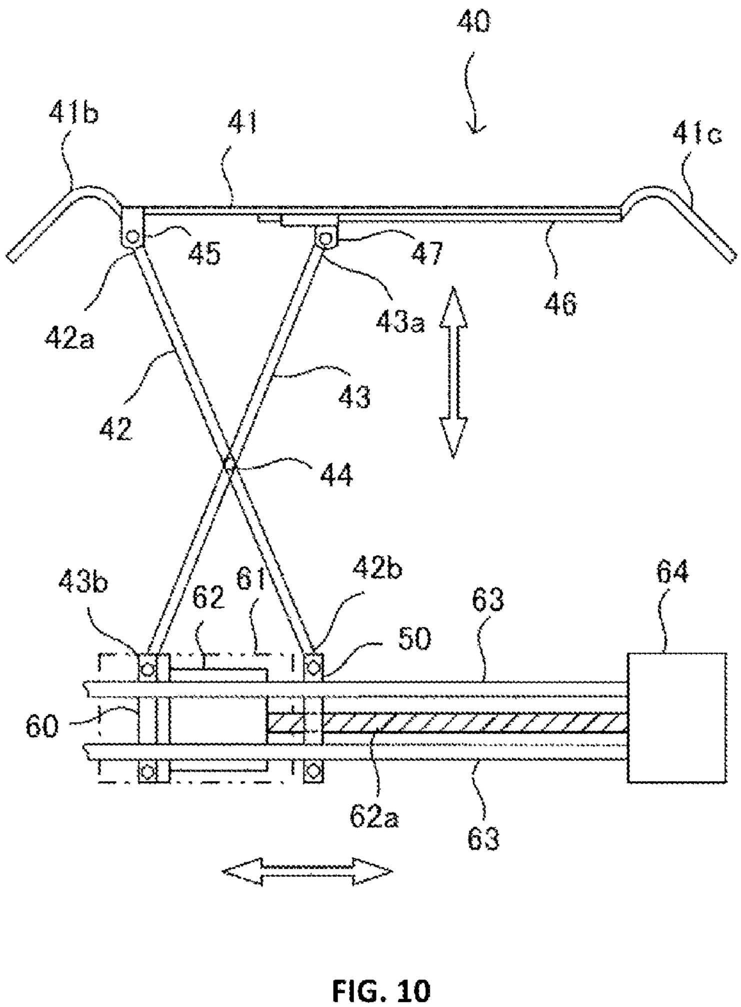
FIG. 10 is a side view of the driving mechanism in a state where the attachment plate is in the uppermost position.

As illustrated in FIG. 10, the driving mechanism 40 has a supporting leg 42 and a supporting leg 43 having a length identical to each other and rotatably coupled to each other in an X shape with a joint 44. The supporting leg 42 has one end 42*a* rotatably coupled to a mount 45 fixed to one end of the attachment plate 41 and has the other end 42*b* attached to a movable disk 50. The supporting leg 43 has one end 43*a* rotatably coupled to a mount 47 moving along a rail 46 fixed to the other end of the attachment plate 41 and has the other end 43*b* rotatably attached to a fixed disk 60 fixed to a housing 61.

Figure 12A:
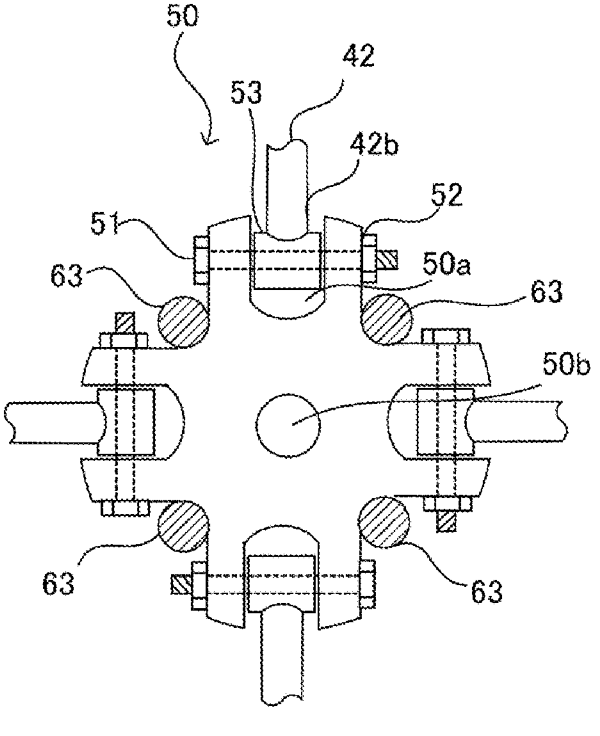
FIG. 12*a* is a front view of a movable disk causing the attachment plate to move.
Figure 12B:
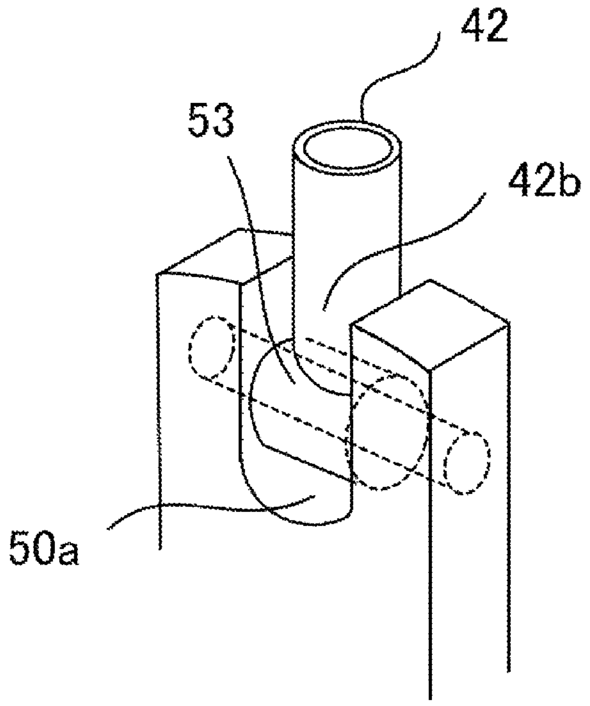
FIG. 12*b* is a perspective view illustrating part of the movable disk.

As illustrated in FIG. 12*a*, the movable disk 50 is provided with the number (four, in this embodiment) of concave grooves 50*a* corresponding to the number of the attachment plates 41 formed in the periphery, and the other end 42*b* of the supporting leg 42 is rotatably coupled to the movable disk 50 at the concave groove 50*a* with a fitting composed of a bolt 51, a nut 52, and a circular pipe portion 53.

The fixed disk 60 has a shape and a structure similar to the movable disk 50 and has concave grooves similar to those of the movable disk 50, and the other end 43*b* of the supporting leg 43 is rotatably coupled to the fixed disk 60 at the concave groove with a similar fitting.

The respective number of the supporting legs 42 and 43 corresponding to the number of the attachment plates 41 are provided, and thus the rest of the supporting legs are similarly rotatably attached to the movable disk 50 or the fixed disk 60, respectively.

The driving mechanism 40 is provided with a drive motor 62 configured as a DD (direct drive) motor fixed to the housing 61 causing the movable disk 50 to move. The drive motor 62 has a rotation shaft 62*a* passing through a circular hole 50*b* provided at the center of the movable disk 50, and the circular hole 50*b* is provided with a thread to engage with a thread formed in the rotation shaft 62*a* of the drive motor 62.

The driving device 40 has a cylindrical object 64 and a cylindrical object 65 (FIG. 6) between which four guide rods 63 are arranged that pass between the concave grooves 50*a* of the movable disk 50 and guide movement of the movable disk 50 (FIG. 12*a*). When the drive motor 62 rotates, the movable disk 50 also tends to rotate but the guide rods 63 prevent the rotation, and thus the movable disk 50 moves in parallel along the guide rods 63.

Figure 11:
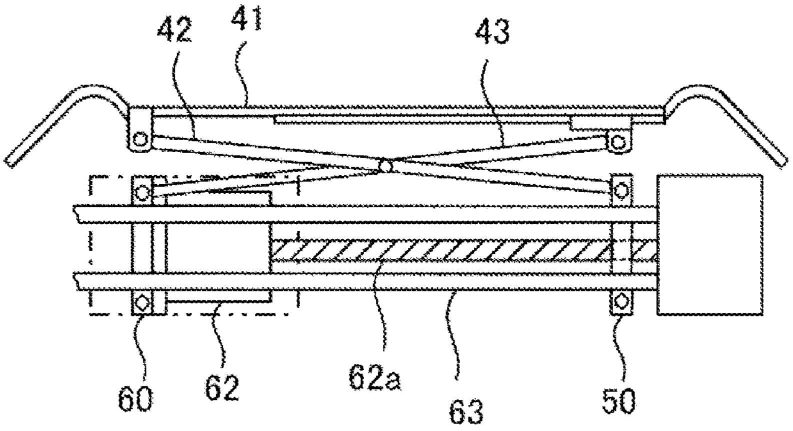
FIG. 11 is a side view of the driving mechanism in a state where the attachment plate is in a lower position.

When the drive motor 62 is driven in such a configuration, the movable disk 50 moves horizontally in accordance with the direction of rotation of the drive motor 62 as illustrated by a double pointed arrow in FIG. 10. Following the movement of the movable disk 50, the one end 43*a* of the supporting leg 43 moves along the rail 46 and thus each attachment plate 41 moves radially. FIG. 11 illustrates a state where the attachment plate 41 moves in the direction of reducing the radial distance.

Since the attachment plates 41 are attached to the respective crossing areas between the substrates 10 and the substrates 20, the substrates 10 and the substrates 20 rotate in accordance with the expansion or contraction of the radial distance of the attachment plates 41 to vary the crossing angle and thus the light source assembly 30 has an enlarged diameter or a reduced diameter.

Figure 13:
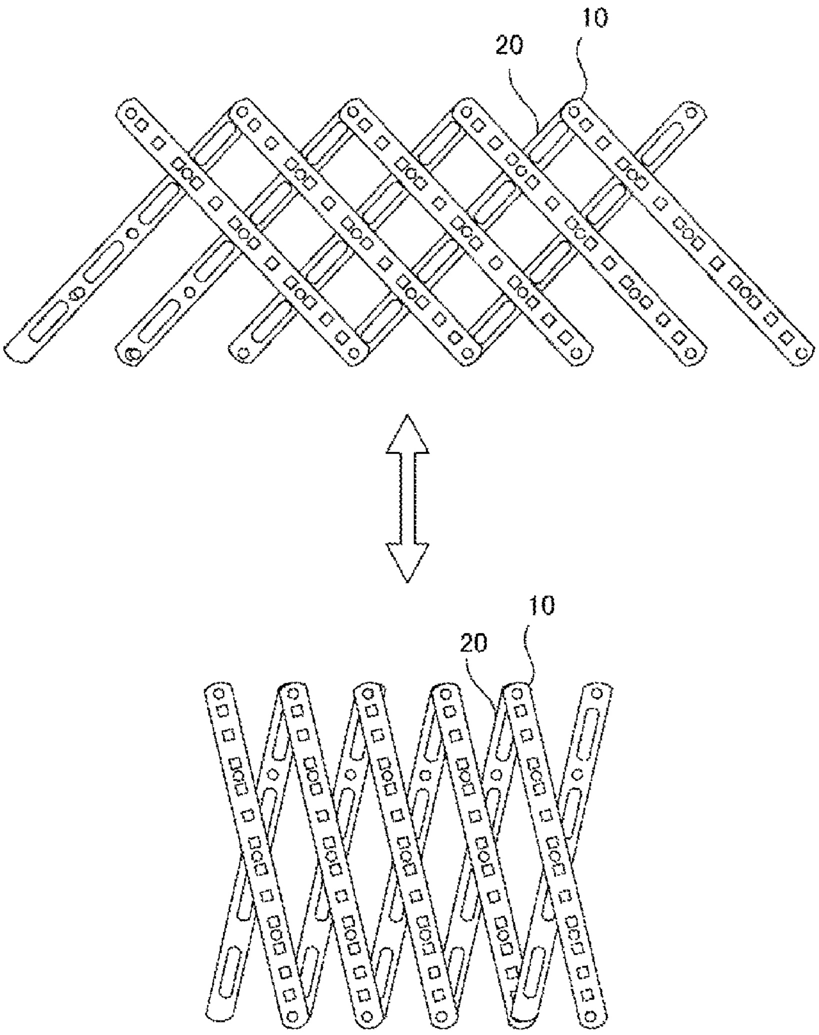
FIG. 13 is a drawing illustrating arrangement of the first and second substrates when the light source assembly has an enlarged diameter or a reduced diameter.

The upper area of FIG. 13 illustrates a state developed on a plane surface, in the state the radial distance of the attachment plates 41 being longer to cause the light source assembly 30 to have an enlarged diameter and to be reduced in the longitudinal direction, and the lower area illustrates a state where the radial distance of the attachment plates 41 being shorter to cause the light source assembly 30 to have a reduced diameter and to extend in the longitudinal direction.

Since the substrates 10 with the LEDs 11 on board of the light source assembly 30 are disposed in a spiral shape, as clearly seen from FIG. 13, the light source assembly 30 is capable of circumferentially uniform irradiation even if the diameter is enlarged or reduced. In addition, being coupled to the driving mechanism 40 via the attachment plates 41, the light source assembly 30 is capable of securely and readily enlarging or reducing the diameter in accordance with radial movement of the attachment plates 41.

In the driving mechanism 40, to allow a plurality of the driving mechanisms 40 to be coupled to each other, a male coupling 70 is attached to the cylindrical object 65 and a female coupling 71 is attached to the cylindrical object 64 via a multiconductor cable 72.

Figure 14:
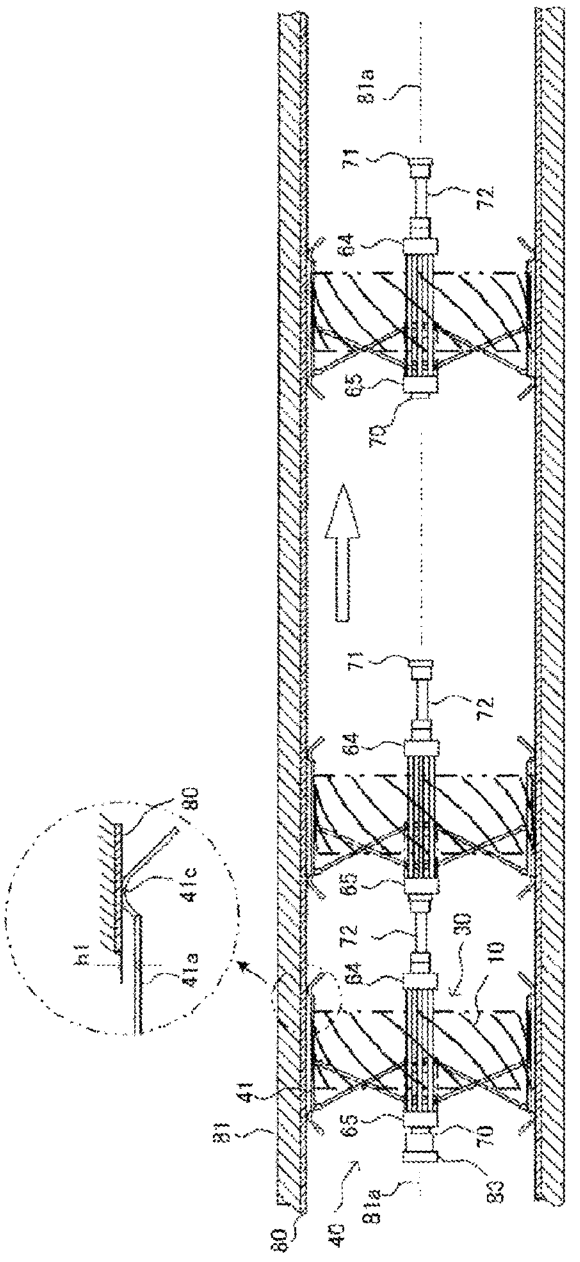
FIG. 14 is a drawing illustrating a state where a plurality of irradiation devices with an enlarged diameter are coupled to each other in a pipe.

FIG. 14 illustrates a state where the plurality of driving mechanisms 40 coupled by the couplings 70 and 71 are in a pipe 81 covered with a lining material 80 impregnated with a photocurable resin or a thermoplastic resin in addition. It should be noted that illustration of the light source assembly 30 in detail causes the drawing to be complex and thus FIG. 14 schematically illustrates the substrates 10 with thick lines.

The driving mechanisms 40 in the coupled state move in the direction indicated by the arrow are drawn by a traction rope (not shown). The drive motor 62 is driven to radially move the attachment plates 41 until the curved portions 41*b* and 41*c* of each attachment plate 41 contact the pipe wall. The light source assembly 30 has an enlarged diameter in accordance with the movement of the attachment plates 41 and the curing resin impregnated into the lining material 80 is cured by irradiation with light emitted from the light source assembly 30. To the rearmost driving mechanism 40, a camera unit 83 is attached via the coupling 70 to observe the curing state of the lining material 80.

As illustrated in the enlarged view of FIG. 14, the curved portions 41*b* and 41*c* of each attachment plate 41 contact the pipe wall even if the pipe diameter varies, and thus it is possible to keep the distance constant from each LED 11 to the pipe wall and also to make the irradiation amount to the pipe wall uniform. Moreover, each LED 11 is located near the inner wall surface of the pipe even if the pipe diameter varies, and thus even low-output light sources are capable of efficient irradiation.

It should be noted that the connectors 13 of the respective substrates 10 are connected in parallel. Each LED 11 of each substrate 10 is led to the connector 13 on the substrate 10 and the respective connectors 13 are connected in parallel, and thus even if one of the LEDs 11 fails, only the substrate 10 with this LED on board malfunctions and the LEDs 11 on the rest of the substrates 10 are lit up and capable of effective irradiation. Although connecting wires are not illustrated in FIG. 14 and the like to avoid complexity, they are led to a power supply arranged inside or outside the irradiation device.

REFERENCE SIGNS LIST

10 Substrate
11 LED
13 Connector
15 Coupling Pin
20 Substrate
22 Opening
30 Light Source Assembly
40 Driving Mechanism
41 Attachment Plate
42, 43 Supporting Leg
50 Movable Disk
60 Fixed Disk
61 Housing
62 Drive Motor
63 Guide Rod
64, 65 Cylindrical Object
70, 71 Coupling
80 Lining Material
81 Pipe
83 Camera Unit

The invention claimed is:

1. An irradiation device arranged inside a cylindrical object to irradiate an inner wall of the cylindrical object with light, the device comprising:

a plurality of long flexible first substrates spirally disposed at regular intervals in a columnar surface-like shape and provided with a plurality of light sources; and the same number of long flexible second substrates as the first substrates, the second substrates being located on an opposite side to a surface provided with the light sources of the first substrates and being disposed in a reverse spiral to the first substrates, wherein the first and second substrates are disposed to cause one end portion of each first substrate to cross one end portion of each second substrate and also to cause another end portion to cross another end portion of each corresponding second substrate in accordance with a spiral shape, and the first and second substrates are rotatably coupled to each other in crossing areas at both end portions of each of the first and second substrates and other crossing areas where the first and second substrates cross each other in accordance with the spiral shape.

2. The irradiation device according to claim 1, wherein a driving mechanism is provided causing a plurality of long attachment plates to radially move, the attachment plates being arranged at predetermined circumferential intervals and being attached to the crossing areas between the first and second substrates, and the first and second substrates radially move in accordance with radial movement of the attachment plates.

3. The irradiation device according to claim 2, wherein the attachment plates have both end portions, each provided with a projecting portion in a curved shape projecting radially outside from an attachment plate surface.

4. The irradiation device according to claim 2, wherein the attachment plates are arranged to locate both end portions where the first and second substrates cross each other on the attachment plate surface, and the crossing areas of the first and second substrates between both end portions are attached to the attachment plates.

5. The irradiation device according to claim 2, wherein the driving mechanism is attached to couplings in front and rear, and a plurality of the driving mechanisms are coupled via the couplings.

6. The irradiation device according to claim 1, wherein each light source is an LED emitting any one of ultraviolet light, visible light, or infrared light or an LED obtained by combining LEDs emitting these kinds of light.

7. The irradiation device according to claim 1, wherein the light sources disposed on each first substrate are connected in series and led to a connector provided on each first substrate, and the connectors on the respective first substrates are connected in parallel.

* * * * *